(12) United States Patent
Kitamura et al.

(10) Patent No.: US 11,947,332 B2
(45) Date of Patent: Apr. 2, 2024

(54) CAD DATA-BASED AUTOMATIC OPERATION DEVICE OF MACHINING CENTER

(71) Applicant: KITAMURA MACHINERY CO., LTD., Toyama (JP)

(72) Inventors: Akihiro Kitamura, Toyama (JP); Kosaku Kitamura, Toyama (JP); Takashi Asano, Toyama (JP); Seiji Amaike, Toyama (JP)

(73) Assignee: KITAMURA MACHINERY CO., LTD., Takaoka (JP)

( * ) Notice: Subject to any disclaimer, the term of this patent is extended or adjusted under 35 U.S.C. 154(b) by 282 days.

(21) Appl. No.: 17/252,829

(22) PCT Filed: Oct. 29, 2019

(86) PCT No.: PCT/JP2019/042349
§ 371 (c)(1),
(2) Date: Dec. 16, 2020

(87) PCT Pub. No.: WO2021/044641
PCT Pub. Date: Mar. 11, 2021

(65) Prior Publication Data
US 2022/0317656 A1    Oct. 6, 2022

(30) Foreign Application Priority Data
Sep. 5, 2019   (JP) .................. 2019-161961

(51) Int. Cl.
*G05B 19/4097* (2006.01)
*G05B 19/4068* (2006.01)

(52) U.S. Cl.
CPC ..... *G05B 19/4097* (2013.01); *G05B 19/4068* (2013.01); *G05B 2219/35165* (2013.01); *G05B 2219/35287* (2013.01)

(58) Field of Classification Search
CPC ............ G05B 19/4097; G05B 19/4068; G05B 2219/35165; G05B 2219/35287;
(Continued)

(56) References Cited

U.S. PATENT DOCUMENTS 5,796,618 A    8/1998  Maeda et al.
6,535,788 B1   3/2003  Yoshida et al.
(Continued)

FOREIGN PATENT DOCUMENTS

CN    1763671 A     4/2006
CN    10 1796463 A  8/2010
(Continued)

OTHER PUBLICATIONS

Search Report dated Oct. 22, 2021, issued in corresponding European Application No. 19 91 8498.7.
(Continued)

*Primary Examiner* — Christopher E. Everett
(74) *Attorney, Agent, or Firm* — BACON & THOMAS, PLLC (57) ABSTRACT

In a CAD data-based automatic operation device of a machining center equipped with a CNC device, the CNC device is provided in a storage unit with a learned model generated by learning beforehand machining conditions including a tool used and cutting conditions, a manufacturing process including a tool trajectory, and a machining program that caused the manufacturing process to be performed in correspondence with one another with respect to each feature subjected to various cutting operations. An automatic machining command generation unit provided in a control unit is provided with: a feature extraction function of extracting features from three-dimensional CAD design data of a machined product; an automatic manufacturing process setting function of automatically determining
(Continued)

required machining conditions and automatically setting a manufacturing process including a tool trajectory, by applying each feature to the learned model; an all manufacturing process setting function of determining a procedure for manufacturing processes for all the features; and a machining command generation function of generating a machining command for causing a machine tool to perform all the manufacturing processes based on the learned model. The automatic manufacturing process setting function is further provided with a function of displaying a 3D model of the machined product generated based on the three-dimensional CAD design data in one or more possible different directions of mounting to a machining unit in a selectable and executable manner and the manufacturing processes are automatically set based on the determined mounting direction.

4 Claims, 5 Drawing Sheets

(58) Field of Classification Search
CPC .......... G05B 2219/35159; G05B 2219/35167; G05B 2219/35313; Y02P 90/02
See application file for complete search history.

(56) References Cited

U.S. PATENT DOCUMENTS

| | | | |
|---|---|---|---|
| 10,338,565 B1 | 7/2019 | Coffman et al. | |
| 2002/0082742 A1 | 6/2002 | Kadono | |
| 2005/0251284 A1* | 11/2005 | Balic | G05B 19/4099 700/182 |
| 2006/0089746 A1 | 4/2006 | Kakino et al. | |
| 2007/0061037 A1* | 3/2007 | Grossmann | G05B 19/4069 700/182 |
| 2010/0305745 A1 | 12/2010 | Iriguchi et al. | |
| 2017/0060104 A1* | 3/2017 | Genma | G05B 13/0265 |
| 2019/0018391 A1 | 1/2019 | Rogers et al. | |
| 2019/0317456 A1* | 10/2019 | Tsuneki | G05B 13/0265 |
| 2020/0005499 A1* | 1/2020 | Tsuneki | G06N 20/00 |
| 2021/0003992 A1* | 1/2021 | Nakamoto | G05B 19/40937 |

FOREIGN PATENT DOCUMENTS

| | | |
|---|---|---|
| CN | 110100213 A | 8/2019 |
| DE | 10 2005 050380 A1 | 6/2006 |
| EP | 0 664 186 A1 | 7/1995 |
| EP | 1217482 A2 | 6/2002 |
| EP | 2189860 A1 | 5/2010 |
| EP | 1043880 A1 | 6/2017 |
| JP | 2000 084794 A | 3/2000 |
| JP | 2000084794 A | 3/2000 |
| JP | 2002 189510 A | 7/2002 |
| JP | 2006 119935 A | 5/2006 |
| JP | WO 2009 028056 A1 | 11/2010 |
| JP | WO 2014 045383 A1 | 8/2016 |
| JP | WO 2018 123116 A1 | 6/2019 |
| KR | 10 2001 0032067 A | 4/2001 |
| WO | 94/08751 A1 | 4/1994 |
| WO | 9408751 A1 | 4/1994 |
| WO | 2009 028056 A1 | 11/2010 |
| WO | 2015/096511 A1 | 7/2015 |
| WO | 2014 045383 A1 | 8/2016 |
| WO | 2018 123116 A1 | 6/2019 |

OTHER PUBLICATIONS

Preliminary Report dated Mar. 8, 2022, issued in corresponding PCT Application No. PCT/JP2019/042349.

Search Report dated Dec. 24, 2019, issued in corresponding International Application No. PCT/JP2019/042349.

Office Action dated Sep. 20, 2022, issued in corresponding European Application No. 19 91 8498.7.

* cited by examiner

CAD DATA-BASED AUTOMATIC OPERATION DEVICE OF MACHINING CENTER

TECHNICAL FIELD

The present invention relates to an automatic operation device of a machining center equipped with a CNC device for machine tools in which time and trouble for a skilled hand to create a machining program using code for an NC language are saved and only by acquiring three-dimensional CAD design data of a machined product, a machining program is automatically created based on the data.

BACKGROUND ART

With respect to present machine tools, especially, machining centers, a material is automatically cut in accordance with a predetermined NC machining program to form an intended product using a numerical control device, a so-called NC (Numerical Control) device.

An NC machining program is created based on machining conditions, including a tool to be used and numeric data (NC data) such as a movement based on coordinate positions in X, Y, Z, and the like and a speed of the tool during machining with the tool and numerical control information on a manufacturing process. Presently, computer numerical control devices (CNC devices) have been used which is further automated by automatically calculating part of numerical control information, for example, correction of a tool diameter, interpolating operation, speed control, and the like with a built-in computer.

Therefore, to create an NC machining program for obtaining a machined product in an intended shape by cutting a material to be machined via automatic operation of a machine tool, especially, a machining center, a machining condition and a manufacturing process for the program must be set beforehand.

Each manufacturing process is determined based on a machining method for cutting each feature to be formed in a machined product. Features cite here refer to step heights of projections and depressions, surface shapes of curves, holes, pockets, slots, and the like in machined products. Usually, a tool suitable for forming these features is appropriately selected from, for example, various milling cutters suitable for facing, various drills suitable for drilling, various end mills suitable for grooving and shoulder grinding, and the like; a machining condition including a cutting condition is established; and a tool trajectory is determined based on the machining condition. Further, a manufacturing process including the above tool selection, tool change, and execution of a tool trajectory is established and an NC machining program corresponding to the manufacturing process is created.

However, an NC machining program itself is created by an engineer using an NC language, such as G code and M code, based on a CAD (Computer Aided Design) design drawing of a machined product. In addition, in recent years, machining has been performed with a sophisticated machine tool, such as simultaneous up to five-axis (X, Y, Z, A, C) control. For this reason, complicated control in which these multiple axes will not interfere with one another is required. Therefore, an NC machining program is also created using CAM (Computer Aided Manufacturing) system based on a three-dimensional CAD diagram.

Owing to CAM operation, code need not be directly manually inputted but a complicated machining program need be created through machining method consideration, tool selection, and machining condition determination by a skilled hand and is thus time-consuming.

Consequently, a device that allows a machining program to be automatically created has been considered. For example, Patent Literature 1 discloses an automatic program creation device in which a cutting condition is determined according to shape and attribute data from a data input unit, a tool path is determined in accordance with the cutting condition, and an NC machining program is created based on the tool path.

CITATION LIST

Patent Literature

[PTL 1]
Japanese Patent Publication No. Hei 6(1994)-97413
[PTL 2]
Japanese Unexamined Patent Application Publication No. Hei 11(1999)-129141
[PTL 3]
Japanese Unexamined Patent Application Publication No. 2002-189510

SUMMARY OF INVENTION

Technical Problem

According to the technology in Patent Literature 1, shape data and attribute data are inputted using a keyboard at a data input unit and a time-consuming, troublesome process of an engineer's input work is required. Further, what is created is just a standard NC machining program from an intermediate tool path data, and the technology requires editing operation of the program picked up in increments of one manufacturing process thereafter. That is, when a complicated special manufacturing process is included, time-consuming editing work by an engineer is still required.

Meanwhile, a different automatic machining information generation device has also been developed (Refer to Patent Literature 2). In this device, a region to be machined is extracted from CAD design data and a machining shape is determined; an applicable tool is selected from a tool database; a cutting speed, a feed speed, and the like are automatically calculated by reading a recommended machining speed and a recommended feed speed for this operation from a machining condition database; and then a tool trajectory is generated and a machining program is created.

Further, a CAM system has also been considered (Refer to Patent Literature 3, for example). In this CAM system, feature data for a machined product is extracted from CAD data and a manufacturing process and a machining area for each manufacturing process are established; material data and a machining model of each manufacturing process are generated; a tool path data is generated based on a tool database and a machining condition database and an NC machining program is then created.

However, to create a complicated NC machining program corresponding to such a manufacturing process that requires complicated control with a sophisticated machine tool such as simultaneous five-axis control for manufacture of a machined product having multiple diverse features, one night is taken even with a conventional CAM system capable of automatically creating a machining program. Presently, a system capable of efficiently and automatically creating such a complicated machining program in so short a time as approximately 10 minutes is not present. Of course, such a technology that such a system is provided in a CNC device for a machine tool and the machine tool is immediately caused to perform precision machining on the spot based on a created machining program is not present, either.

In consideration of the above-mentioned problem, it is an object of the present invention to provide an automatic operation device of a machining center that enables automatic, immediate execution of a manufacturing process on the spot and simple manufacture of an intended machined product just by acquiring three-dimensional CAD design data of the machined product.

Solution to the Problem

To achieve the above object, the present invention is an automatic operation device of a machining center equipped with a CNC device connected to a machine tool and performing numerical control.

The CNC Device includes:

a control unit provided with various work operation modes related to the machine tool in advance and having a function of causing a selected work operation mode to be performed;

a displaying unit having a menu screen display function of displaying items corresponding to the work operation modes in a selectable manner and a function of chronologically displaying work operation information of a work operation mode being performed with respect to each selected item; and a storage unit storing identification information of multiple tools so housed that the tools can be changed and attached to a rotary main spindle of a machining unit of the machine tool via an automatic tool changer and tool information including the material and shape of each tool corresponding to the identification information.

The control unit is configured to perform drive control on the machining unit of the machine tool in accordance with a predetermined machining program and causes the material to be machined to be cut while changing and attaching tools to the rotary main spindle in correspondence with each manufacturing process.

In this automatic operation device of a machining center, the control unit includes an automatic machining command generation unit that automatically generates a machining command for causing the machine tool to perform all the manufacturing processes for cutting the material to be machined based on three-dimensional CAD design data of an intended machined product, and the storage unit includes a learned model generated by learning, with respect to each feature subjected to various cutting operation, machining conditions including a tool used and cutting conditions when a relevant cutting operation was performed and machining data including a tool trajectory and an execution program for the trajectory in correspondence with each other in advance.

The automatic machining command generation unit has:

a feature extraction function of extracting features to be subjected to a cutting operation from three-dimensional CAD design data of the machined product on the basis of the shape of the material to be machined; an automatic manufacturing process setting function of automatically determining machining conditions required for cutting with respect to each feature and automatically setting a manufacturing process including a tool trajectory based on the machining conditions, by applying each extracted feature to the learned model; an all manufacturing process setting function of determining a procedure for performing manufacturing processes for all the features and setting a series of all the manufacturing processes required up to the finish of the machined product; and a machining command generation function of generating a machining command for causing the machine tool to perform all the set manufacturing processes based on the learned model.

The automatic manufacturing process setting function further includes a function of: generating a 3D model of the machined product based on the three-dimensional CAD design data and causing the displaying unit to display the 3D model; and selecting one or more different mounting directions in which the machined product can be mounted on the machining unit and the 3D model in each selected mounting direction to be displayed in a selectable manner and the manufacturing process for cutting each feature is automatically set based on the selected and determined mounting direction.

The machining conditions cited in relation to the present invention are the same as machining conditions set on an ordinary machine tool. The machining conditions are conditions required for determining a manufacturing process and mainly includes a type and a shape of a tool, a diameter and a material of a tool, and cutting conditions including main spindle rotational speed, cutting feed, cutting width, a depth of cut (in Z direction) of a cutter, and the like as well as the properties of a material to be machined, a method for clamping with a machining unit jig, a clamp position, a mounting direction, and the like. A tool trajectory, a so-called tool path is determined for obtaining each intended cut feature based on these machining conditions.

The CNC device can be caused to acquire three-dimensional CAD design data of an intended machined product stored in, for example, USB via a USB port. Alternatively, the CNC device can be caused to acquire three-dimensional CAD design data of the intended machined product from another computer on a computer network via network communication.

According to the above-mentioned configuration of the present invention, in the automatic machining command generation unit of the control unit, features to be formed by cutting are extracted on the basis of a shape of a material to be machined based on three-dimensional CAD design data of an intended machined product acquired as mentioned above; machining conditions for each feature are automatically determined by applying the feature to the learned model stored in the storage unit; a tool to be used and a tool trajectory are determined based on the machining conditions; and a manufacturing process including specifying and changing the tool and up to execution of the tool trajectory is automatically set. Further, a procedure for performing the manufacturing processes for all the features is determined and a series of all the manufacturing processes is set; and a machining command for causing the machine tool to perform all the set manufacturing processes is efficiently and automatically set based on the learned model. Therefore, an operator's necessity for creating an NC program in advance is obviated and the machined product is automatically and immediately manufactured on the spot only by inputting three-dimensional CAD design data to the CNC device.

The learned model is obtained by learning machining conditions including a tool used and cutting conditions and machining data including a tool trajectory and an execution program for the trajectory for each of various features with respect to an enormous amount of past cutting operation data accumulated by the present inventors et al. That is, the learned model is obtained by learning all the pieces of data required for cutting each feature in correspondence with one another. Therefore, machining conditions required for cutting features for the manufacture of a new machined product and a manufacturing process including a tool trajectory based on the machining conditions are automatically determined and set in a short time based on the learned model. Further, a machining command for causing the machine tool to perform the manufacturing process is also immediately and automatically generated.

The machining command for causing the machine tool to perform the set manufacturing process may, of course, be an NC program as before. However, the present invention is not limited to a program using such an NC language as G code and any other machining program or any command signal that enables direct drive control on the machine tool may be utilized as long as the set manufacturing process can be performed.

Execution of a manufacturing process with a machine tool is substantially achieved by performing a tool trajectory with a specified tool. This execution of a tool trajectory is implemented by relative linear movement or rotational movement between the tool side and a table or the like on the work side caused by motor drive in each axis. That is, a tool trajectory is performed by drive control on a motor in each axis. More specifically, according to an ordinary NC program, each motor is driven by a pulse train signal obtained by read NC data being converted at an information processing circuit. The pulse train signal instructs actual tool movement by a motor rotation angle corresponding to a number of pulses of the signal, that is, position control and further instructs an actual tool moving speed by rotational speed control on a motor corresponding to a pulse frequency. Therefore, execution of a tool trajectory can be achieved by using a corresponding pulse train signal to directly instruct each motor without intervention of an NC program.

Consequently, the machining command for performing the set manufacturing process according to the present invention may include such a command signal that directly controls driving of each motor. For example, execution of a series of manufacturing processes can be instructed by what is configured by combining a pulse train signal controlling driving of a motor in each axis corresponding to a tool trajectory with a command signal for tool specification and tool change. A pulse train signal itself can be simply generated based on a pulse train signal which has been used in correspondence with various tool trajectories included in machining data learned when the learned model is generated in advance.

In conventional NC programs created using G code or M code, a very large number of interpolating functions are used. Meanwhile, when a direct command signal without intervention of an NC program is generated and used as a machining command for performing an automatically set manufacturing process, these interpolating functions are omitted; therefore, reduction of a machining time and enhancement of machining accuracy can be achieved. By performing positioning by actually set actual values, not by feedback control, thermal displacement is eliminated and real-time control free from a delay to a command in servo control is implemented. Therefore, any load fluctuation can be instantaneously coped with and as a result, significant reduction of a machining time and enhancement of accuracy can be achieved.

The machining conditions and the tool trajectory for setting the manufacturing process are determined based on a cutting direction of each feature and these cutting directions are determined according to an orientation of the machined product at the time of final completion of cutting. Therefore, the orientation of the machined product, that is, a direction of mounting to a machining unit is determined before the machining conditions and the tool trajectory are determined by the automatic manufacturing process setting function of the automatic machining command generation unit.

Consequently, according to the present invention, the automatic manufacturing process setting function is further provided with a function of first generating a 3D model of the machined product based on the three-dimensional CAD design data to cause the displaying unit of the CNC device to display the 3D model and selecting one or more different mounting direction in which the machined product is mounted on the machining unit and displaying the 3D model in each selected mounting direction in a selectable manner. By selecting and determining one that provides the most practical and efficient manufacturing process from among the automatically proposed and displayed different mounting directions, an efficient machining command is automatically generated based on that mounting direction.

As one or more automatically proposed different mounting directions, first, one that can be taken as a mounting direction of the relevant machined product only has to be selected based on the three-dimensional CAD design data. For example, by setting a center axis of a machined product from an external shape of the product, a mounting direction in which an orientation of the center axis is changed can be selected. Specifically, first, a mounting direction in which the center axis is perpendicular and a mounting direction in which the center axis is horizontal can be selected. Aside from the foregoing, a mounting direction in which the center axis is tilted is also selectable depending on an external shape of a machined product. Then, by selecting a relatively large face that can provide a mounting face with respect to each orientation of the center axis, a possible placement direction can also be respectively determined. Therefore, when a possible mounting direction of a machined product is only selected based on the three-dimensional CAD design data as mentioned above, multiple mounting directions can be displayed as a 3D model in a very short time. As mentioned above, the most suitable one can be selected from among these automatically displayed mounting directions.

Since a machined product often includes at least one face where a cut feature is usually not formed, taking such a face having no feature, that is, a face that does not require cutting as a mounting face is practical. Therefore, an operator can instantaneously select, as the most suitable mounting direction, a mounting direction in which a face of the machined product requiring no cutting provides a mounting face by checking a 3D model in one or more proposed mounting directions on a display. When one or more faces where a feature is not formed and which can provide a mounting face are present, an operator can easily determine a face to be a mounting face in a short time from mounting stability and the like based on the shapes of a fixing jig, the machined product, and a material to be machined without complicated computation by a computer.

As mentioned above, according to the present invention, by causing the CNC device to acquire three-dimensional CAD design data of a machined product, first, one or more possible mounting directions for the product are automatically selected and displayed. By merely selecting and determining the most suitable one from among these mounting directions, a machining command that enables execution of all the manufacturing processes up to obtaining the machined product from a material to be machined based on the mounting direction is automatically generated in a short time based on the learned model. Therefore, an operator can cause precision machining to be performed on the material to be machined fixed on the machining unit of the machine tool in a state corresponding to the mounting direction in accordance with the automatically generated machining command just by triggering a cycle start.

Therefore, an operator need not prepare an NC program in advance and thus need not have knowledge about such an NC language as G code or M code or experience about machining conditions associated with various features. Only with three-dimensional CAD design data, a machined product can be simply, efficiently, and automatically manufactured just by inputting the data to the CNC device.

In addition, the automatic machining command generation unit is preferably provided with a simulation function for automatically verifying whether the tool trajectory of the set manufacturing process enables smooth machining without interference or not and an interference detection function.

The simulation function causes the displaying unit to display a tool trajectory of a specified tool in a set manufacturing process as 3D computer graphic moving images, for example, animation moving images. The interference detection function stops moving images and causes an interference alert to be displayed when interference occurs between a tool and a non-cutting area of a material to be machined or a peripheral member of the machining unit while the moving images are being displayed. An operator can check the presence or absence of interference with respect to a tool trajectory of a specific tool while checking moving images and, when an interference alert is displayed, can simply understand that a machining command generated based on the tool trajectory must be modified.

Consequently, by additionally providing the automatic machining command generation unit with a machining command improvement function of, at the time of occurrence of an interference alert, altering the tool with interference to another tool and causing a machining command to be automatically generated again, the automatically generated machining command can be made completely safe. With this machining command improvement function, machining conditions and a tool trajectory based on the machining conditions are newly determined in accordance with the altered tool and an improved manufacturing process is automatically set. Further, an improved machining command corresponding to the thus improved manufacturing process is automatically generated and a simulation process is repeated until interference is eliminated. As a result, a machining command for a manufacturing process in which a tool trajectory is performed without interference are automatically generated without need for time-consuming verification or the like by a skilled hand; therefore, an operator can easily perform perfect product machining in a short time with peace of mind.

The displaying unit according to the present invention may be a liquid crystal display or the like conventionally provided in a CNC device. Especially adopting a touch panel type is desirable because a work operation mode can be selected or performed on a display in a shorter time and easily. In this case, when items of various work operation modes are displayed as icons in a menu screen in a selectable and executable manner, workability is further enhanced.

In this case, an item of "CAD data-based automatic operation for machining center" mode from input of the above-mentioned three-dimensional CAD design data to automatic generation and execution of a machining command is displayed as an icon in a menu screen. As a result, an operator can trigger the "CAD data-based automatic operation for machining center" mode just by touching the icon. And then, the operator only has to perform touch operation only when a mounting direction is selected and determined immediately after three-dimensional CAD design data is read and when a complete machining command generated immediately after is started. Thus, the operator can easily perform manufacture of an intended machined product in a short time as if the operator operated a smartphone.

Advantageous Effects of the Invention

According to the CAD data-based automatic operation device of a machining center of the present invention, as described up to this point, the following effect is brought about: By causing three-dimensional CAD design data of an intended machined product to be acquired, possible mounting directions are immediately proposed through a 3D model display in a selectable manner and the most suitable mounting direction can be selected and determined. Based on the determined mounting direction, extracted features are applied to a learned model and a machining command causing a machine tool to perform all the manufacturing processes required for obtaining the machined product in a short time is automatically generated. For this reason, only with three-dimensional CAD design data of a machined product, an operator can immediately, on the spot, cause the machining center to automatically operate in accordance with the automatically generated machining command without need for skilled-labor's knowledge. Thus, the intended machined product can be simply manufactured in a short time.

DESCRIPTION OF EMBODIMENTS

Figure 1:
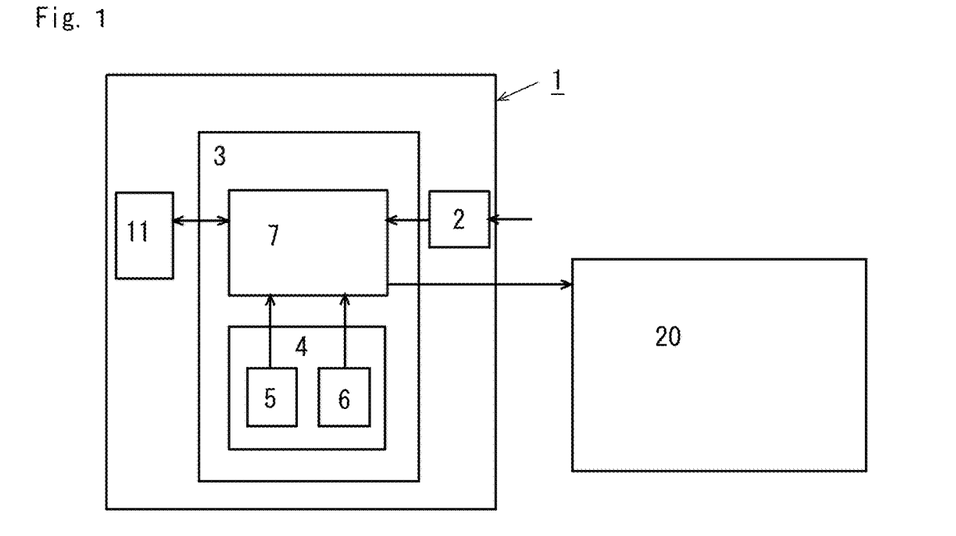
FIG. 1 is a block diagram schematically illustrating a configuration of a principal part of a CAD data-based automatic operation device of a machining center in an embodiment of the present invention.
Figure 5:
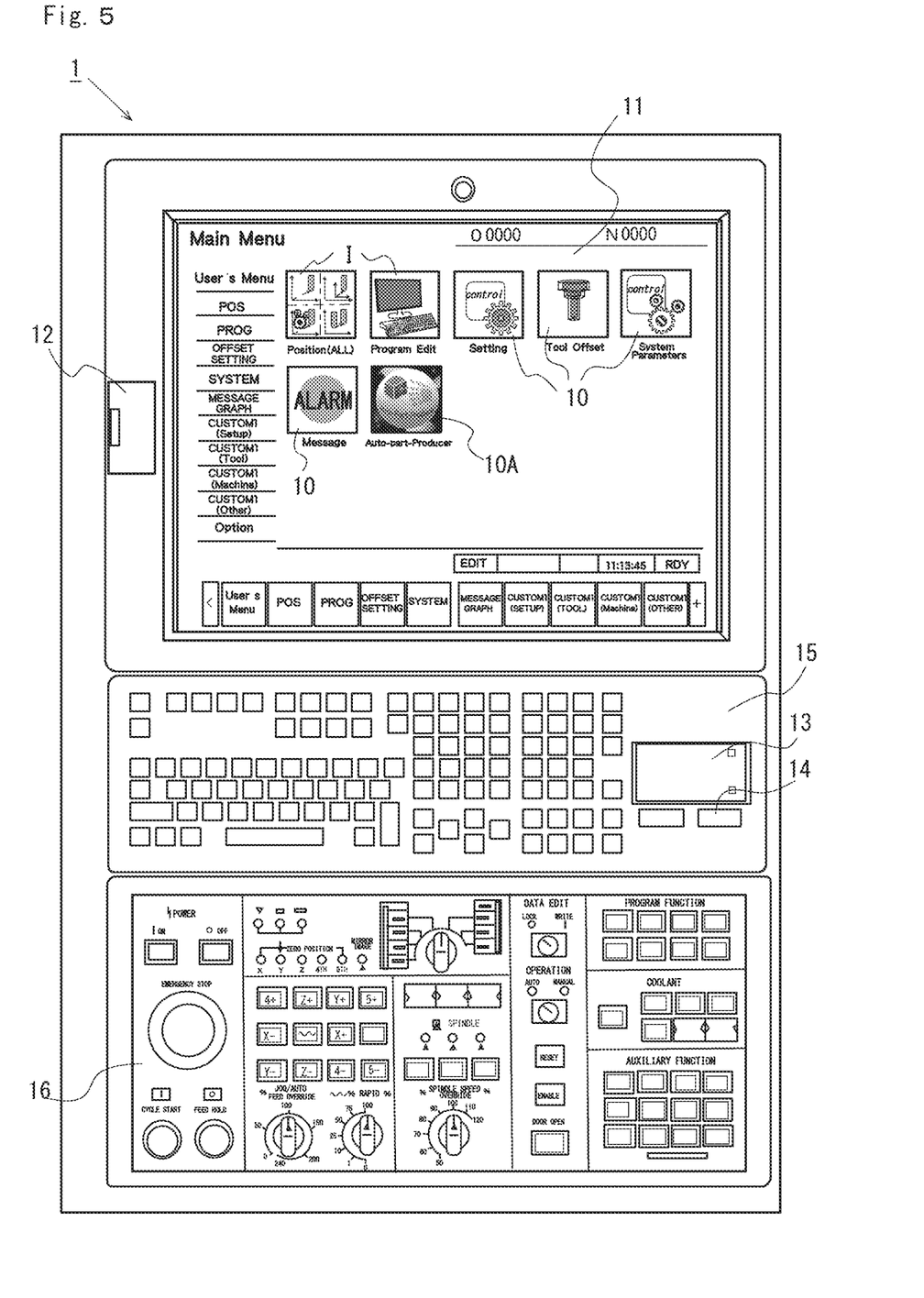
FIG. 5 is a schematic front view illustrating a basic configuration of a control panel of a CNC device.

FIG. 1 illustrates a general configuration of a principal part of an automatic operation device of a machining center in an embodiment of the present invention in the form of block diagram. The CNC device in the present embodiment has a basic configuration common to those of conventional CNC devices. A more specific description will be given. The CNC device 1 is installed on, for example, an outer wall surface of a guard encircling a machine tool body and a front face of the body of the CNC device is a control panel as shown in FIG. 5. The control panel is provided with a touch panel-type liquid crystal display 11 as a displaying unit. The touch panel-type liquid crystal display 11 displays a menu screen in which items of various work operation modes for a machine tool provided in the CNC device 1 in advance are respectively shown as an icon 10.

A USB port 12 is disposed in the vicinity of the display so that varied data can be inputted and outputted, and a keyboard 15 including a mouse pad 13 and a mouse button 14 is disposed below the display. Further, an operation panel 16 provided with switches and buttons related to various operations of a machine tool is provided in an area below the keyboard 15.

The CNC device 1 according to the present embodiment is provided with a "CAD data-based automatic operation" mode as one of work operation modes and is so configured that an icon 10A of that item is also displayed in the menu screen. Therefore, the CAD data-based automatic operation mode can be selected and performed by touching the icon 10A.

Under the control of a control unit 3, the CNC device 1 performs drive control on a machining unit of the machine tool in accordance with a predetermined machining command and causes cutting operation to be performed on a material to be machined while sequentially changing and attaching a tool to a rotary main spindle in correspondence with each manufacturing process. Detailed illustration of the machine tool 20 will be omitted here.

As shown in FIG. 1, the control unit 3 of the CNC device 1 is provided with a storage unit 4, in which identification information corresponding to a large number of tools housed in a magazine or the like of the machine tool 20 and tool information 5 such as a type, a shape, a material, and the like of each tool, associated with the identification information are stored. Each tool is managed according to the identification information. Meanwhile, the machine tool 20 is provided with an automatic tool changer (not shown), and a tool to be used is appropriately specified and changed and attached between the rotary main spindle of the machining unit and the magazine by the changer, with predetermined timing during automatic operation according to a machining program.

The storage unit 4 is further provided with a learned model 6 generated based on enormous amount of past cutting operation data in advance. The learned model 6 was generated by learning machining data as machining conditions including a tool used and cutting conditions and a manufacturing process including a tool trajectory and a machining program with which the manufacturing process was performed, for each feature such as projections and depressions, distortions, holes, pockets, and slots, in faces subjected to various cutting operations, in correspondence with one another.

In the present embodiment, further, the control unit 3 is provided with an automatic machining command generation unit 7 having: an automatic manufacturing process setting function of automatically setting a manufacturing process for forming features of a newly manufactured machined product by applying the features to the learned model 6; and a machining command generation function of automatically generating a machining command for causing the machine tool to perform the manufacturing process. In addition, the automatic machining command generation unit 7 has a feature extraction function of extracting each feature of a machined product based on acquired three-dimensional CAD design data of the machined product. That is, a feature of a machined product applied to the learned model 6 when a manufacturing process is set and a machining command is generated, is obtained from three-dimensional CAD design data of the machined product by the feature extraction function.

The automatic manufacturing process setting function of the automatic machining command generation unit 7 further includes a function of: after each feature of the machined product is selected based on three-dimensional CAD design data of the machined product by the feature extraction function, forming a 3D model of the machined product and causing the liquid crystal display 11 to display the 3D model; and selecting one or more possible different mounting directions of the machined product and causing a 3D model in each selected mounting direction to be displayed on the display 11 in a selectable manner. An operator can select and determine the most suitable mounting direction from among those proposed and displayed. Therefore, automatic setting of a manufacturing process is forwarded based on the thus determined mounting direction.

In the present embodiment, further, the automatic machining command generation unit 7 is provided with: a simulation function of causing a tool trajectory of an automatically generated manufacturing process to be displayed on the display 11 as 3D computer graphics, for example, animation moving images; and an interference detection function of, when interference occurs between a tool and a non-cutting area of a material to be machined or a peripheral member of the machining unit while moving images are being displayed, stopping the moving images and causing an interference alert to be displayed. The automatic machining command generation unit is also provided with a machining command improvement function of, at the time of an interference alert, altering the tool which caused the interference to a different tool and generating a machining command again.

Hence by automatically repeating the above-mentioned simulation process and improvement of a machining command until interference is eliminated with respect to all the tool trajectories, a machining command with a perfect tool trajectory can be easily obtained in a short time without time-consuming verification by a skilled hand.

With respect to the CNC device 1 having the above-mentioned configuration, processes from automatic generation of a machining command based on three-dimensional CAD design data of an intended machined product to execution of an automatic operation of a machining center will be described below. FIG. is a flowchart illustrating a machining command generation process; and FIGS. 3(a) and 3(b) and FIGS. 4(a) and 4(b) are schematic diagrams illustrating an example of a screen shown on the display 11 at each step of an automatic manufacturing process setting process.

Figure 2:
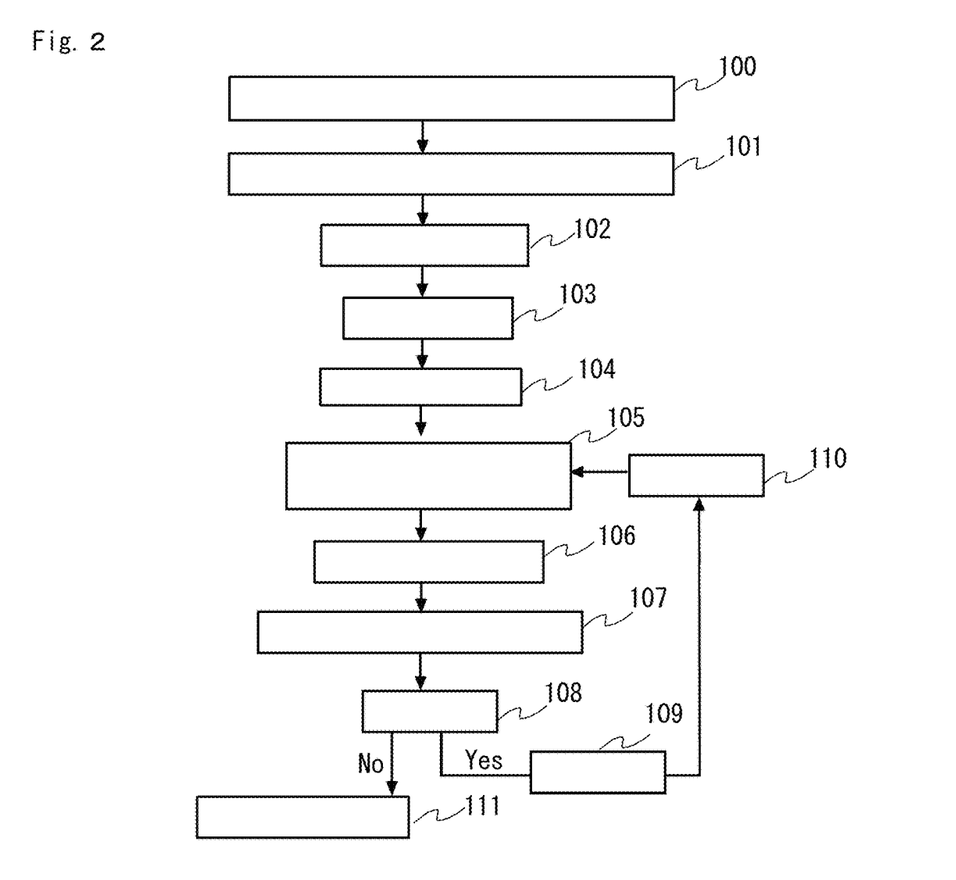
FIG. 2 is a flowchart illustrating a process of machining command generation by the automatic machining command generation unit in FIG. 1.

First, the icon 10A corresponding to the "CAD data-based automatic operation" mode is selected in a menu screen displayed on the touch panel-type liquid crystal display 11 of the control panel by touching the icon. Thus, the CAD data-based automatic operation mode is started (100). Subsequently, three-dimensional CAD design data of the target machined product stored in USB is read (101) via a data acquisition unit 2, such as the USB port 12. As a result, a process of automatic machining command generation is substantially started. CAD data may be read from another computer via a computer network using wireless or wired communication, for example, Ethernet (registered trademark) communication.

Figure 3A:
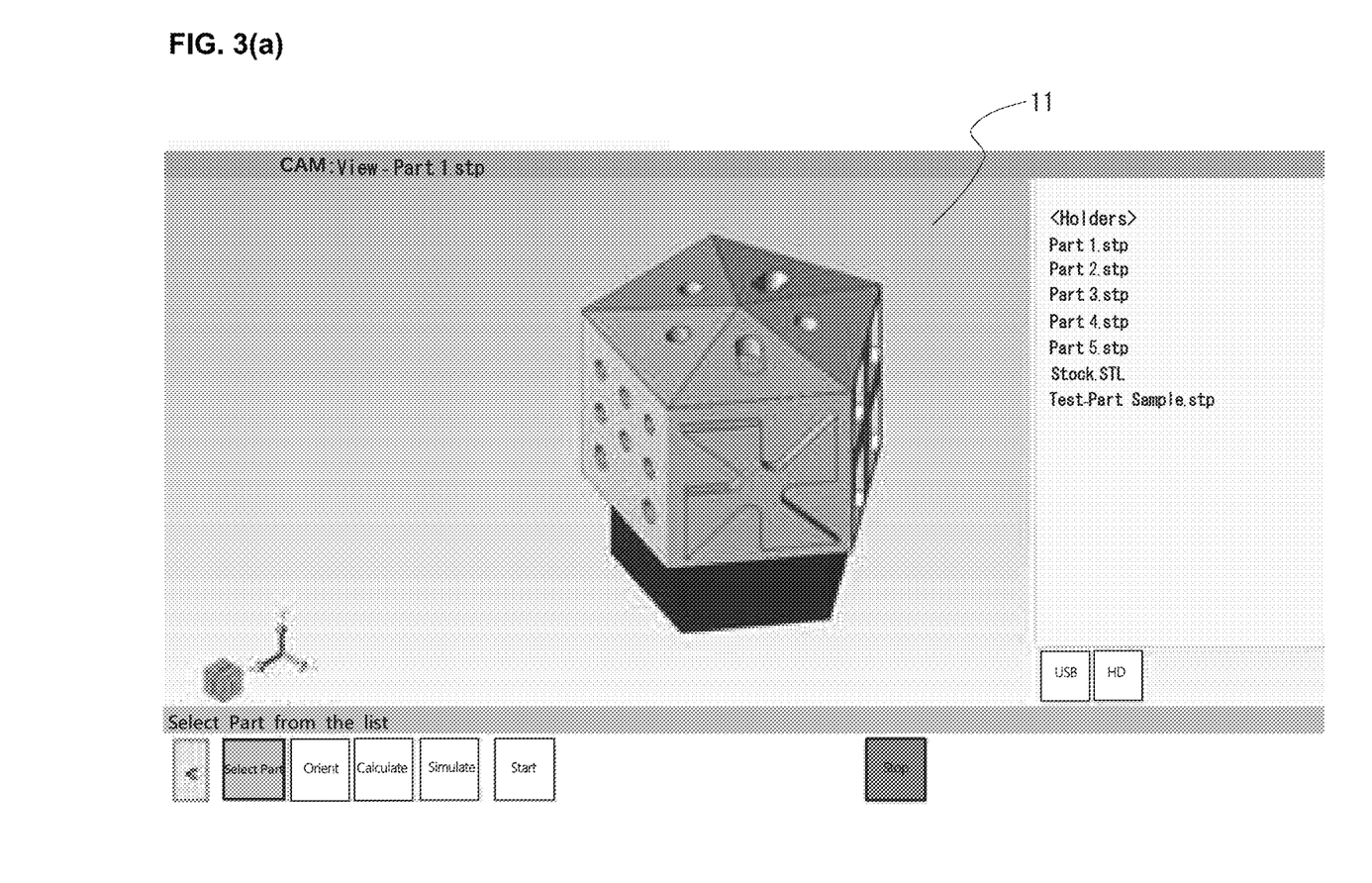
FIG. 3(a) is a schematic diagram illustrating an example of a screen in which a 3D model of a machined product in the machining command generation process shown in FIG. 2 and shows a 3D model display screen that appears immediately after three-dimensional CAD design data of a target machined product is selected and read.

The automatic machining command generation unit 7 forms a 3D model of the machined product based on the three-dimensional CAD design data and causes the 3D model to be displayed on the display 11 (102) as illustrated in FIG. 3(*a*), and extracts all the features (103). Further, the automatic machining command generation unit selects one or more possible mounting directions of the machined product and displays the 3D model on the display in each selected mounting direction in a selectable and determinable manner. Here, a case where the external shape of the machined product is a pentagonal pyramidal prism (a shape obtained by mating a pentagonal pyramid with the upper face of a pentagonal prism) will be taken as an example. In this case, a mounting direction in which the center axis of the pentagonal pyramidal prism is perpendicular and a mounting direction in which the center axis is horizontal are selected. However, in the case of the horizontal mounting direction, one of the side faces of the pentagonal prism portion will be selected as a mounting face.

Figure 3B:
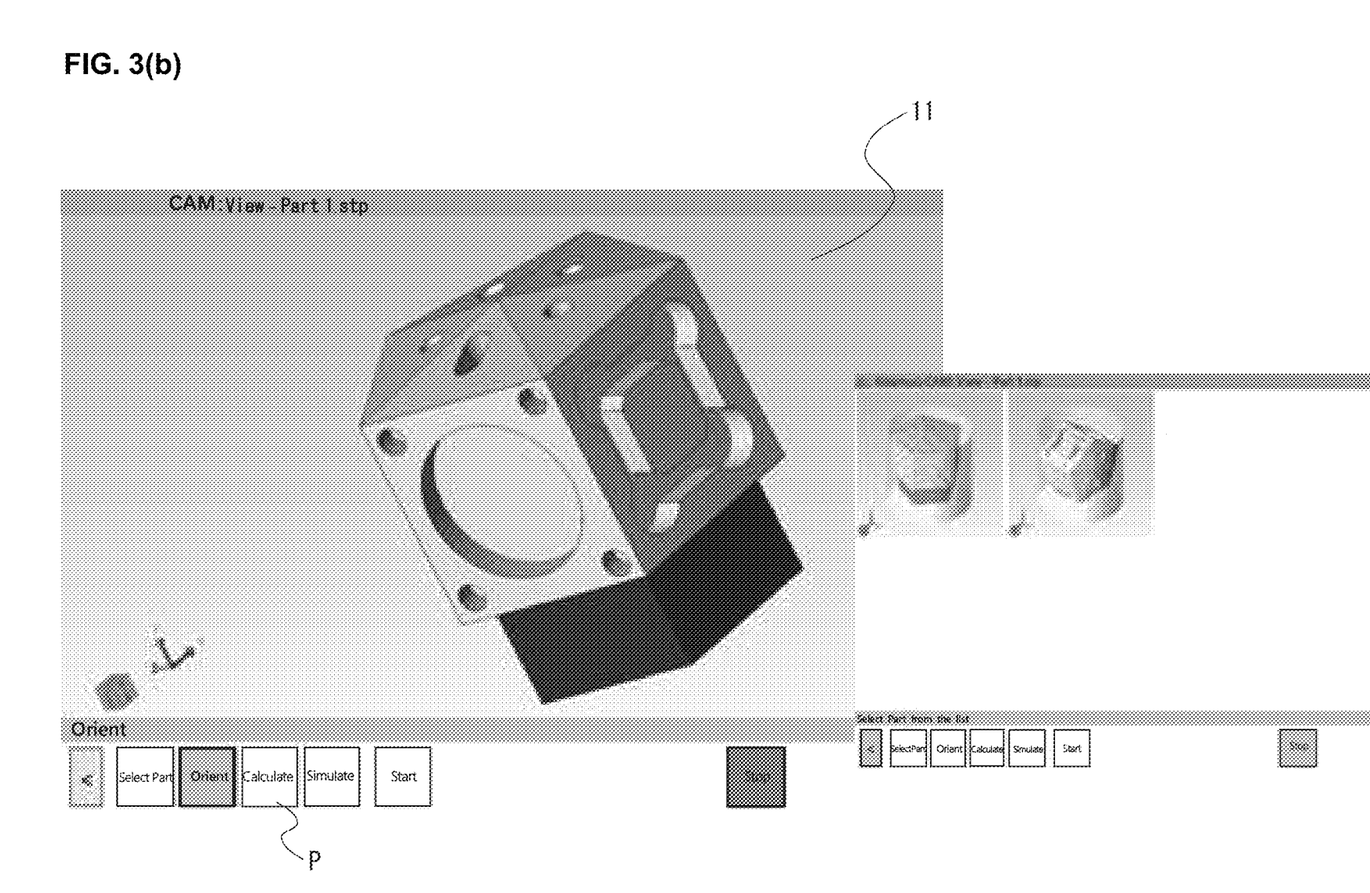
FIG. 3(b) is a schematic diagram illustrating an example of a screen in which a 3D model of a machined product in the machining command generation process shown in FIG. 2 and shows a display screen that appears when one of 3D models displayed in proposed different mounting directions is selected.

When the operator touches and selects one in a mounting direction determined to be most suitable from among the displayed 3D models in the different mounting directions on the display 11 as shown in FIG. 3(*b*), the mounting direction is determined (104). In the case of the above pentagonal pyramidal prism, the bottom face of the pentagonal prism portion does not have a feature and does not require cutting. Therefore, a direction in which the bottom face provides a mounting face, that is, the mounting direction in which the center axis is perpendicular can be immediately determined to be practical and most suitable.

The operator selects an automatic machining command generation start button P on the display 11 by touching the button, after selecting and determining this most suitable mounting direction of the machined product. Then, in the automatic machining command generation unit 7, based on the selected and determined mounting direction, substantial manufacturing process setting (105) is started. Specifically, by applying each feature extracted in advance to the learned model 6, a tool suitable for machining a respective feature is selected from tools registered in the tool information 5 in the storage unit 4 and various cutting conditions and machining conditions are determined. A tool trajectory is also determined based on the machining conditions. Then, a manufacturing process including specifying the tool required for cutting with respect to each feature, mounting the tool, and up to the tool trajectory is set. When multiple kinds of features are present, an efficient procedure for manufacturing processes corresponding to all the features is determined and a series of all the manufacturing processes required for manufacturing the intended machined product is set. Thereafter, a machining command for causing the machine tool to perform all the set manufacturing processes is generated (106) immediately.

Figure 4:
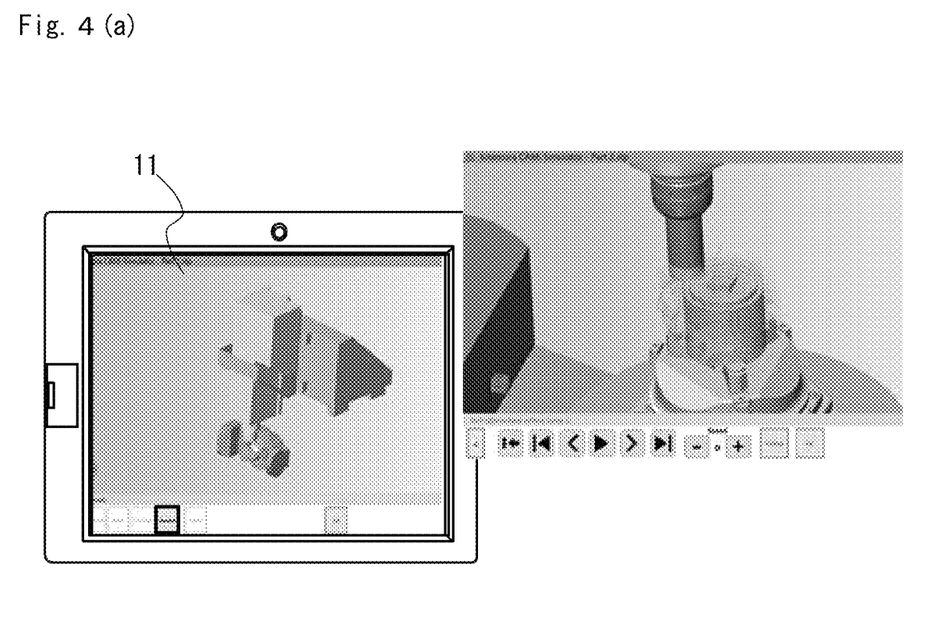
FIG. 4(a) is a schematic diagram illustrating an example of a screen in which animation moving images are displayed during a tool trajectory simulation and shows a display screen that appears when the simulation is in progress.
FIG. 4(b) is a schematic diagram illustrating an example of a screen in which animation moving images are displayed during a tool trajectory simulation and shows a display screen that appears when the simulation ends.

When setting of the manufacturing processes (105) and generation of the machining command (106) are completed, a simulation of tool trajectories for the set manufacturing processes is started (107) immediately and such 3D animation moving images as shown in FIG. 4(*a*) are displayed on the display 11. In this display of the moving images, the presence or absence of interference between a tool and a non-cutting area of the material to be machined or a peripheral member of the machining unit of the machine tool is detected (108) along the tool trajectory. When interference does not occur and simulation moving images of the tool trajectory are not stopped at some midpoint as shown in FIG. 4(*b*) and completes to the end, the manufacturing process and the machining command set and generated based on that tool trajectory can be securely determined to be free from interference with the machine tool 20 and be practicable. In this case, when the material to be machined is fixed on the machining unit in a direction corresponding to the mounting direction of the machined product selected and determined when the 3D model was displayed, the operator only has to operate a cycle start button S on the display 11 by touching the button. Thus, a cycle start (111) is immediately triggered on the spot according to the generated machining command so that manufacture of the machined product can be forwarded.

Meanwhile, when interference occurs during a simulation, moving images are stopped and an interference alert is displayed (109). After the interference alert is displayed, the automatic machining command generation unit 7 identifies the tool that causes the occurrence of interference and selects the second-best tool based on the learned model 6 to perform tool alteration (110). And the automatic machining command generation unit 7 newly determines machining conditions and a machining trajectory with the altered tool and re-sets the manufacturing processes (105). Then, a machining command is generated again (106) in correspondence with the improved manufacturing processes. The above process from the tool alteration to the machining command modification is repeated until the occurrence of interference is eliminated in a simulation; therefore, a machining command is improved by optimal tool and tool trajectory, a perfect machining command is easily generated in a short time.

When the manufacturing processes and the machining command are improved and simulation moving images with the improved tool trajectory completes to the end without being stopped by an occurrence of interference and the manufacturing processes and machining command based on that tool trajectory are determined to have become free from a problem and perfect, the operator only has to operate the button S on the display 11 by touching the button. Then, a cycle start (111) of the manufacturing processes according to the improved and perfect machining command is triggered and manufacture of the machined product is performed on the machine tool. With the CNC device 1 in the present embodiment, it took only approximately 10 minutes to perform operations from reading of three-dimensional CAD design data of a machined product to generation of a perfect machining command by way of a simulation unlike conventional CAM systems, in which it used to take one night to automatically create a program.

As described up to this point, according to an automatic operation device of a machining center in the present embodiment, an operator need not prepare an NC program beforehand at much expense in time and effort and only has to input three-dimensional CAD design data of a machined product to the CNC device 1. Thereafter, the operator is required just to perform touch operation with predetermined icons and buttons on the touch panel-type liquid crystal display 11 as if the operator operated a smartphone. Then, a machining command is automatically generated and an automatic operation of the machining center is performed in accordance with the machining command; therefore, the intended machined product can be very easily manufactured.

REFERENCE SIGNS LIST

1: CNC device
2: Data acquisition unit
3: Control unit
4: Storage unit
5: Tool information
6: Learned model
7: Automatic machining command generation unit
10, 10A: Icon
11: Touch panel-type liquid crystal display
12: USB port
13: Mouse pad
14: Mouse button
15: Keyboard
16: Operation panel
20: Machine tool
P: Automatic machining command generation start button
S: Cycle start button

The invention claimed is:

1. An automatic operation device of a machining center equipped with a CNC device connected with a machine tool and performing numerical control,
wherein the CNC device includes:
a control unit provided with various work operation modes related to the machine tool in advance and having a function of causing a work operation mode selected from the various work operation modes to be performed;
a displaying unit having: a menu screen display function of displaying items corresponding to the various work operation modes in a selectable manner; and a function of chronologically displaying work operation information of a work operation mode corresponding to a selected item from the items being performed with respect to each selected item; and
a storage unit storing: identification information of a plurality of tools so housed that the plurality of tools can be changed and attached to a rotary main spindle of a machining unit of the machine tool via an automatic tool changer; and tool information including a material and shape of each of the plurality of tools corresponding to the identification information,
the automatic operation device of the machining center being so configured that the control unit performs drive control on the machining unit of the machine tool in accordance with a predetermined machining program and causes cutting operation on a material to be machined to be performed while changing and attaching a tool of the plurality of tools to the rotary main spindle in correspondence with each manufacturing process,
wherein the control unit is provided with an automatic machining command generation unit that automatically generates a machining command for causing the machine tool to perform all the manufacturing processes for cutting the material to be machined based on three-dimensional CAD design data of an intended machined product,
wherein the storage unit includes a learned model generated beforehand by, with respect to each feature subjected to various cutting operations, learning machining conditions including a tool used and cutting conditions when a relevant cutting operation was performed and machining data including a tool trajectory and an execution program for the trajectory, and at a time of the learning, the machining conditions and the machining data are associated in correspondence with each other,
wherein the automatic machining command generation unit is provided with:
a feature extraction function of extracting features to be subjected to a cutting operation from three-dimensional CAD design data of the machined product on the basis of a shape of the material to be machined; an automatic manufacturing process setting function of automatically determining machining conditions required for cutting with respect to each feature of the extracted features and automatically setting a manufacturing process including a tool trajectory based on those machining conditions, by applying each extracted feature to the learned model; an all manufacturing process setting function of determining a procedure for performing manufacturing processes for all the extracted features and setting a series of all the manufacturing processes required up to finish of the machined product; and a machining command generation function of generating a machining command for causing the machine tool to perform all the set manufacturing processes based on the learned model, and
wherein the automatic manufacturing process setting function further includes a function of: generating a 3D model of the machined product based on the three-dimensional CAD design data and causing the displaying unit to display the 3D model; and selecting one or more different mounting directions in which the machined product can be mounted on the machining unit and causing the 3D model in each selected mounting direction to be displayed in a selectable manner and the manufacturing process for cutting each feature is automatically set based on a selected and determined mounting direction from the different mounting directions.

2. The CAD data-based automatic operation device of the machining center according to claim 1,
wherein the automatic machining command generation unit is further provided with:
a simulation function of causing the displaying unit to display the tool trajectory for the set manufacturing process as a 3D computer graphics moving image;
an interference detection function of, when interference occurs between a tool and a non-cutting area of a material to be machined or a peripheral member of the machining unit while the 3D computer graphics moving image is being displayed, stopping the 3D computer graphics moving image and displaying an interference alert; and
a machining command improvement function of, at the time of the interference alert, altering a tool which caused the interference to a different tool, determining a tool trajectory based on machining conditions corresponding to the altered tool to re-set a manufacturing process, and generating an improved machining command.

3. The CAD data-based automatic operation device of the machining center according to claim 2, wherein the displaying unit is a touch panel-type display installed on a front face of the CNC device and has a function of respectively displaying items of each of the various work operation modes as icons in the menu screen in a selectable and executable manner, and wherein the displaying unit is provided as one of the icons with an item corresponding to "a CAD data-based automatic operation for the machining center" mode, in which the automatic machining command generation unit generates the machining command for causing the machine tool to perform automatic operation based on the three-dimensional CAD design data through application to the learned model.

4. The CAD data-based automatic operation device of the machining center according to claim 1, wherein the displaying unit is a touch panel-type display installed on a front face of the CNC device and has a function of respectively displaying items of each of the various work operation modes as icons in the menu screen in a selectable and executable manner, and wherein the displaying unit is provided as one of the icons with an item corresponding to "a CAD data-based automatic operation for the machining center" mode, in which the automatic machining command generation unit generates the machining command for causing the machine tool to perform automatic operation based on the three-dimensional CAD design data through application to the learned model.

\* \* \* \* \*